United States Patent Office 3,522,514
Patented Aug. 4, 1970

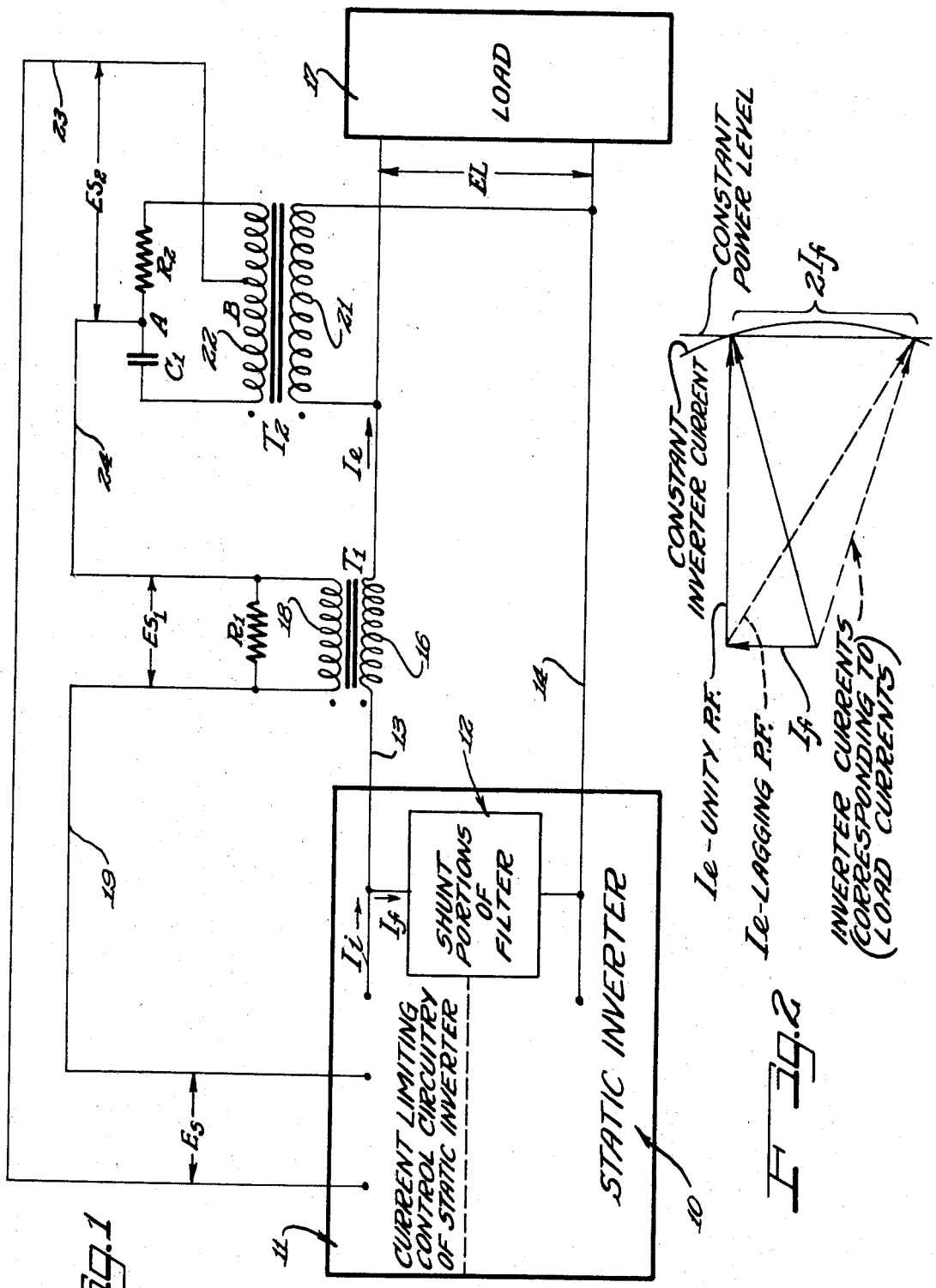

3,522,514
CURRENT SENSING CIRCUIT FOR FILTERED STATIC INVERTERS
Edward W. Tornberg, Novelty, Ohio, assignor to TRW Inc., Cleveland, Ohio, a corporation of Ohio
Filed Dec. 13, 1967, Ser. No. 690,310
Int. Cl. H02h 7/12; H02m 1/18
U.S. Cl. 321—14               1 Claim

ABSTRACT OF THE DISCLOSURE

A circuit for sensing the current in a static inverter having a filter and connecting the output to a current limiting control circuit of the static inverter to protect if from overload. A voltage proportional to load current and a voltage proportional to the power-frequency component of the shunt filter current are combined to obtain the control voltage.

BACKGROUND OF THE INVENTION

The invention relates generally to static inverters and in particular to a novel protection circuit for preventing overload in a static inverter. Since static inverters may have filters in their output portions, reactive power-frequency current will be drawn which must be supplied by the inverter as well as the reactive current and resistive current supplied to the load. The components of the inverter may be injured if excessive currents occur as, for example, during heavy overloads or if shorts occur. Under these conditions, most of the initial current is supplied from stored energy in the filter of the inverter and it is important to sense this current immediately if the control circuit is to react quickly enough to protect the inverter.

SUMMARY OF THE INVENTION

A circuit develops a signal voltage which is a measure of the current in an inverter. The voltage has two components, one which is directly proportional to load current and the second is proportional to the power-frequency component of the filter of the inverter. A pair of transformers are used to generate these signals and combine them to obtain the signal voltage.

It is an object of the present invention therefore, to provide a protective circuit for a static inverter.

Another object is to synthesize a control signal proportional to the internal current of a static inverter and to limit this current when it reaches a level which would damage the inverter.

A feature of the invention is found in the provision for a current sensing circuit for use with a current limited static inverter which has an output filter drawing reactive power-frequency current. The internal inverter current is synthesized by detecting the load current and the load voltage and phase shifting it to the proper angle.

Further objects, features and advantages will become apparent from the following description and claim when read in view of the drawings, in which:

BRIEF DESCRIPTION OF THE DRAWINGS

FIG. 1 is a schematic drawing of the current sensing circuit of this invention, and FIG. 2 is a phasor diagram showing various currents in the circuit.

DESCRIPTION OF THE PREFERRED EMBODIMENTS

FIG. 1 illustrates a static inverter designated generally as 10 which has a current limiting control circuit 11 forming a part thereof and which has an output filter. The shunt portions of the filter are designated generally as 12.

A pair of output leads 13 and 14 are connected to the output of the static inverter and the shunt portions 12 of the output filter are connected between leads 13 and 14.

A current transformer $T_1$ has its primary 16 connected to lead 13. A load 17 is connected to lead 14 and the other side of primary 16.

A resistor $R_1$ is connected across the secondary 18 of transformer $T_1$. A lead 19 connects one side of secondary 18 to the current limiting control circuit 11 of the static inverter.

A second transformer $T_2$ has its primary 21 connected across the load 17 between lead 14 and the other side of primary 16.

A condenser $C_1$ and resistor $R_2$ are connected across the secondary 22 of transformer $T_2$.

The center point B of secondary 22 is connected by lead 23 to the second input terminal of the current limiting control circuit 11.

The point A between resistor $R_2$ and condenser $C_1$ is connected to the other side of secondary 18 by lead 24.

In operation, in order to limit the internal inverter current $I_i$, a signal voltage $E_s$ is developed at leads 19 and 23 and fed to current limiting control circuit 11.

The first component of $E_s$ is directly proportional to load current $I_l$ and is derived from transformer $T_1$ and voltage developing resistor $R_1$.

The second component of $E_s$ simulates a voltage proportional to the power-frequency component of the shunt filter current $I_f$ by sensing the load voltage EL and phase shifting it to the proper angle with the network consisting of transformer $T_2$, capacitor $C_1$ and resistor $R_2$. This voltage will typically lead the load voltage by close to ninety degrees. The signal voltage then is proportional to $I_e$ plus $I_f$ on a steady state power-frequency basis. The sum of these currents is equal to the inverter current so the desired signal is available.

FIG. 2 is a phasor diagram. It can be seen that assuming pure leading reactive current in the filter, the inverter is capable of producing the same resistive current when the lagging reactive component of load current equals $2I_f$ as it is with a unity power factor load.

The present circuit synthesizes the actual inverter current rather than load current and does this by synthesizing the proportional signal in such a way that transient response to sudden load-current change is not sacrificed.

The principles of the invention explained in connection with the specific exemplifications thereon will suggest many other applications and modifications of the same.

I claim:

1. A circuit for protecting a static inverter having a current limiting control circuit and having a filter with shunt portions and connected to a load comprising, a first transformer connected in series with the load, a first resistor connected across the secondary of the transformer and a voltage developed across the first resistor which is proportional to the load current, a second transformer with its primary connected across the load, a phase shift circuit connected across the secondary of said second transformer and said phase shift circuit comprising a capacitor and second resistor connected in series across said secondary of said second transformer, a tap point formed on the secondary of said second transformer, a voltage proportional to the shunt currents of said filter developed between said tap point and the junction point between said resistor and said second capacitor, and the voltage across said resistor and the voltage between the tap point of said secondary of said second transformer and the junction point between the capacitor and said second resistor added together to produce a control signal for protecting said static inverter.

References Cited

UNITED STATES PATENTS 1,894,114  1/1933  Mittag _____ 321—19
3,253,208  5/1966  Britten et al. _____ 321—14
3,377,538  4/1968  Stich _____ 321—19 X J D MILLER, Primary Examiner W. H. BEHA, Jr., Assistant Examiner U.S. Cl. X.R.

321—19